United States Patent [19]

Mielnicki

[11] 4,383,367
[45] May 17, 1983

[54] POTATO SCOOP

[75] Inventor: Joseph Mielnicki, Wilmington, Del.

[73] Assignee: Alco Foodservice Equipment Company, Miami, Fla.

[21] Appl. No.: 325,328

[22] Filed: Nov. 27, 1981

[51] Int. Cl.$^3$ .............................................. B26B 3/00
[52] U.S. Cl. ..................................... 30/279 R; 30/280; 30/302
[58] Field of Search ................. 30/279 R, 279 A, 280, 30/278, 302, 301, 303

[56] References Cited

U.S. PATENT DOCUMENTS

| 126,426 | 5/1872 | Thurston et al. | 30/302 |
| 164,667 | 6/1875 | Winslow | 30/301 |
| 726,707 | 4/1903 | Lavender | 30/302 |
| 790,760 | 5/1905 | Stuart | 30/279 A |
| 826,266 | 7/1906 | Newman | 30/280 |
| 924,124 | 6/1909 | Worcester | 30/279 A |
| 1,261,689 | 4/1918 | Bristle | 30/280 |
| 1,818,964 | 8/1931 | Smith | 30/280 |
| 2,188,020 | 1/1940 | Tewell | 30/278 |
| 2,355,312 | 8/1944 | Lui | 30/279 R |
| 2,507,872 | 5/1950 | Unsinger | 30/280 |
| 3,259,980 | 7/1966 | Espino | 30/279 R |

FOREIGN PATENT DOCUMENTS 415684  8/1934  United Kingdom ................. 30/278

Primary Examiner—James G. Smith
Assistant Examiner—J. T. Zatarga
Attorney, Agent, or Firm—Howson and Howson

[57] ABSTRACT

A tool which can separate the skin of a potato from its meat while simultaneously cutting the meat into usable sections is disclosed. The tool has a handle which mounts at one end a cutting edge assembly shaped to cut along the inside of the potato skin and lengthwise through the meat of the potato when the tool is held in one hand and a partially-baked potato which has been cut lengthwise is held in the other and the tool manipulated to cause the cutting edge assembly to be drawn lengthwise through the potato.

7 Claims, 4 Drawing Figures

POTATO SCOOP

FIELD OF THE INVENTION

The present invention relates to cutlery, and more particularly, the present invention relates to special-purpose cutlery which is designed to be used for cutting the skin of a potato from its meat and simultaneously slicing the meat lengthwise.

BACKGROUND OF THE INVENTION

In recent years, there has been a trend toward serving potato skins in restaurants. Potato skins are obtained by first baking a potato until it is about two-thirds baked, slicing the potato lengthwise and scooping the meat out of each half of the potato to leave two skin shells and a quantity of potato meat. The scooped meat is usually served as mashed potatoes, and the skins are sliced and fried.

The currently known method of preparing potato skins has been labor intensive so that they are expensive to the ultimate consumer. As a result, they have generally only been served in more expensive restaurants where the patrons could easily afford the higher costs. Since there is an increasing demand for potato skins in "fast food" restaurants, there is a demand for a simple tool which would enable potato skins to be prepared on a mass production basis while simultaneously permitting the meat of the potato to be formed into shapes suitable for frying.

OBJECTS OF THE INVENTION

With the foregoing in mind, a primary object of the present invention is to provide a novel tool for use in preparing potato skins for frying.

It is another object of the present invention to provide a hand-held tool for use in removing the meat of a potato from its skin while simultaneously slicing the meat into segments suitable for further processing.

A still further object of the present invention is to provide a tool for separating in a relatively rapid manner potato skins from the potato meat.

SUMMARY OF THE INVENTION

More specifically, the present invention provides a tool for use in cutting and removing the meat from a potato which has been partially-baked and cut in half lengthwise. The tool comprises a handle and means providing a shaped cutting edge assembly extending away from the handle at an obtuse angle. The cutting edge assembly has a generally circular hoop-like periphery divided by a central diametrically-extending blade. A pair of blades extends radially outward from about the center of the hoop and are connected to the surrounding blade. The central blade, and diverging blade pair cooperate with the peripheral blade to form at least a pair of segment-shaped cross-sections. Thus, the skin and meat of a partially-baked potato can be removed and simultaneously sliced when the potato half is held in one hand and the tool is held in the other and the blades are engaged with the meat of the potato and drawn lengthwise therethrough.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENTS

Figure 1:
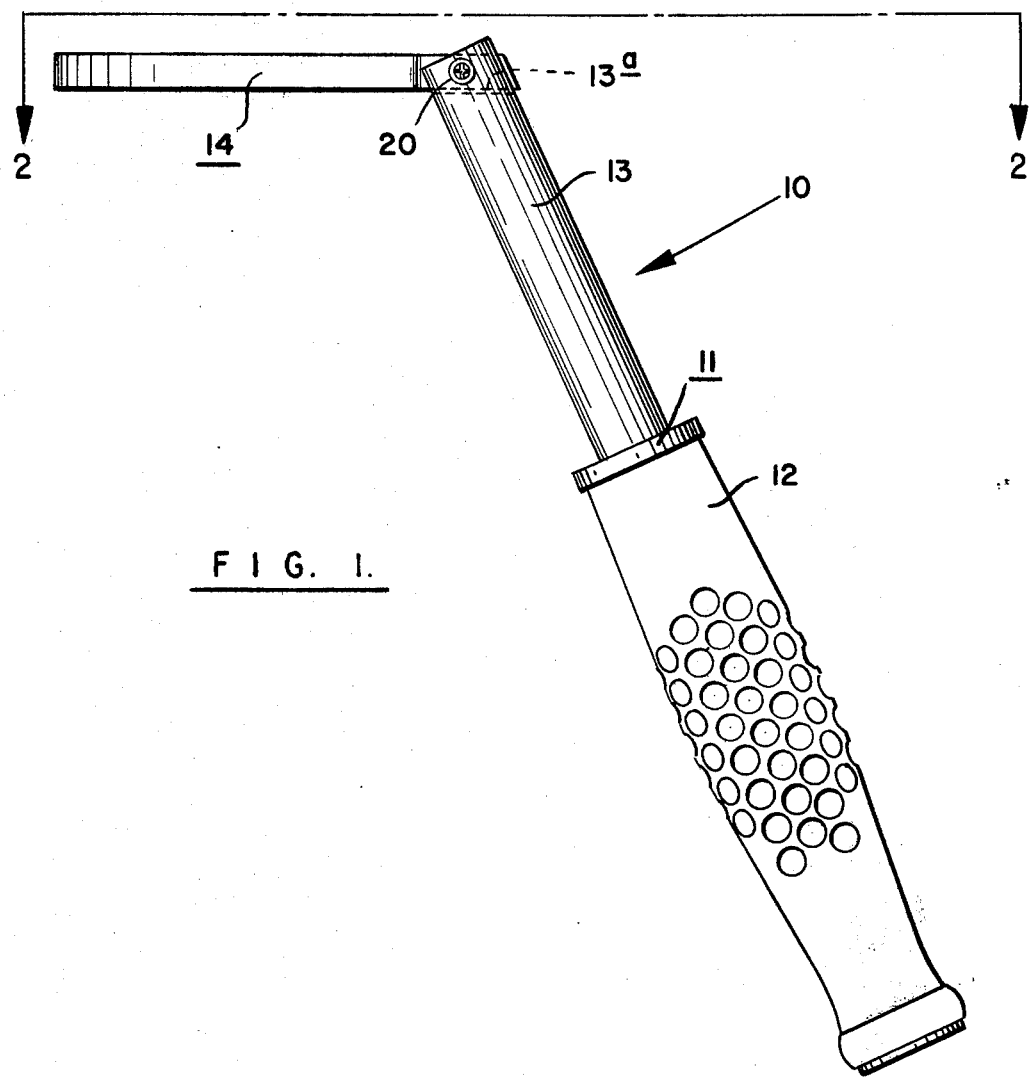
FIG. 1 is a side elevational view in full scale of a potato scoop which embodies the present invention.

Referring now to the drawings, FIG. 1 illustrates a potato scoop 10 which embodies the present invention. As best seen therein, the scoop 10 comprises a handle 11 having a hand grip portion 12 of plastic molded around an elongated, preferably aluminum, rod 13. The hand grip 12 is preferably shaped and roughened so as to be capable of being gripped firmly and comfortably. A shaped cutting blade assembly 14 is mounted at the upper end of the handle rod 13. The blade assembly 14 is disposed in a solid plane which forms an obtuse angle with respect to the rod portion of the handle 11. An obtuse angle which has been found to be beneficial is about 110°.

Figure 2:
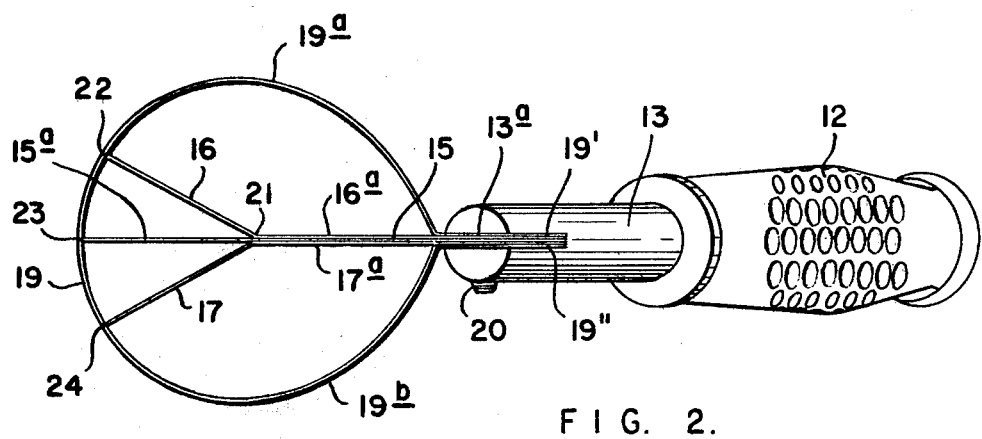
FIG. 2 is a view taken on line 2—2 of FIG. 1.

Referring now to FIG. 2, the cutting blade assembly 14 comprises an elongated central stem 15 which extends outwardly from the center of the rod 13. A pair of blades 16 and 17 diverge from the central stem 15 at a location spaced from the upper end of the handle rod 13, at about the midpoint of the length of the stem 15. The blades 16 and 17 form an acute angle of about 60° with respect to one another. The central stem 15 has a portion 15a which extends further outwardly from the point of divergence of the blades 16 and 17, bisecting the acute angle formed between the blades 16 and 17.

The blades 15a, 16 and 17 cooperate to form closed segments with an arcuate blade 19 which extends across the outer or distal ends of the blades 15a, 16 and 17. The arcuate blade 19 is formed in the shape of an oblate hoop having a pair of legs 19a and 19b which curve from the distal end of the central stem blade 15a and merge toward one another adjacent to the upper end of the handle 13. See FIG. 2. Each leg, such as the leg 19a has a prebent mounting extension 19′, and the extensions 19′ and 19″ are received in an inclined slot 13a in the outer end of the handle 13. The diverging blades 16 and 17 have rearwardly-extending stem portions 16a, 17a, respectively, which engage along opposite sides of the central stem 15 and which are clamped between the hoop extensions 19′ and 19″ in the slot 13a by means of a set screw 20. The various blade sections are soldered at locations 21–24 to rigidify the assembly. Preferably, the entire blade assembly 14 is fabricated of a ribbon of stainless steel having a thickness of about 0.015 inches and an overall width of about ¼ inch. The slot 13a in the end of the rod 13 is inclined to prevent the blade assembly 14 from pivoting about the set screw 20 when pressure is applied when used. As a result, the blade assembly is resistant to bending about an axis transverse to the handle 11.

If desired, the blade assembly 14 may be fabricated by soldering the proximal ends of the hoop legs 19a and 19b together and to the diverging blade extensions 16a and 17a adjacent the upper end of the handle 13. This structure, however, would be more labor intensive to manufacture than the embodiment illustrated in FIGS. 1 and 2 because of the additional soldering.

In use, a potato is partially-baked until it is about two-thirds done, as compared with a potato which is fully baked and ready to eat. A fully baked potato is characterized by a relatively soft interior; whereas a partially-baked potato (as the term is used herein) has meat which is relatively less soft. Since baking is a function of time, temperature and size of potato, it is difficult to specify any baking time and temperature; however, for a typical Idaho potato of average size, baking time would be about 45 minutes at a temperature of 350° F. A partially-baked potato, after being cut lengthwise, has meat which is not as hard as a fresh potato but not as soft as a completely baked potato. The meat is, therefore, relatively cohesive so that it can be removed in solid chunks and further processed.

Figure 3:
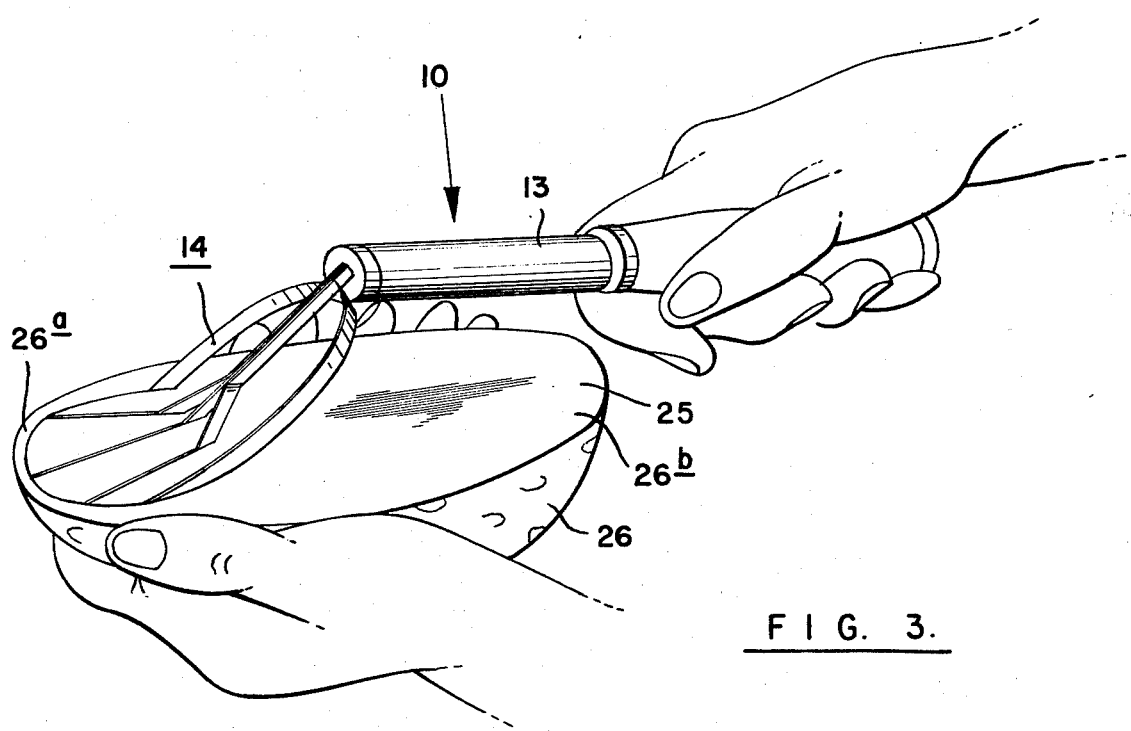
FIG. 3 is a perspective view showing the potato scoop of the present invention in use.
Figure 4:
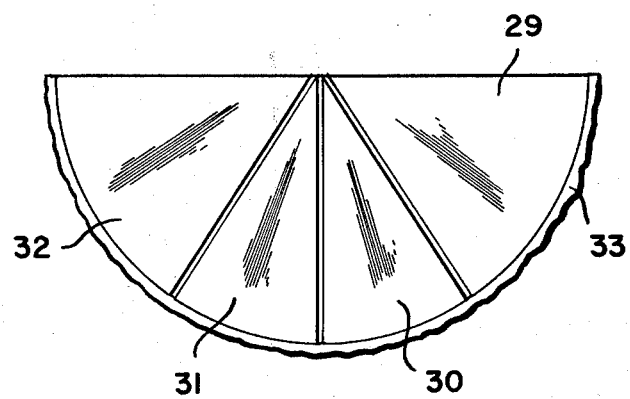
FIG. 4 is a transverse sectional view of the potato illustrated in FIG. 3 after having been cut by the tool.

Referring now to FIG. 3, a partially-baked potato which has been cut lengthwise in half is shown gripped in the palm of one hand. The handle 11 of the tool 10 is gripped in the other hand in the manner shown. The blade assembly 14 is engaged with the cut surface 25 of the potato 26 at the end 26a of the potato 26 which is located away from the person using the tool 10. The bottom edge of the cutting blade assembly 14 is laid against the cut surface 25 of the potato and is pulled downwardly and lengthwise of the potato in a single sweeping movement. As the blade assembly 14 advances lengthwise through the potato 26, it cuts the meat of the potato into segments, such as the segments 29–32 illustrated in FIG. 4. The blade assembly 14 is disengaged from the potato 26 by an upward and outward motion of the handle 11 relative to the rear end 26b of the potato 26. With a little practice, the operator can feel the hoop blade 19 moving along the inside of the skin 33 of the potato 26 as it is being cut and can adjust his hand motion accordingly. The segments 29–32 are removed from the skin shell 33 simply by inverting the shell 33 and dropping the segments into a container.

The segments 29–32 cut from the potato 26 have been found to be of a desirable cross-section for frying in a deep fat fryer such as found in most fast food restaurants. The skins can, of course, be prepared in any of several well known cooking methods, including deep fat frying.

In view of the foregoing, it should be apparent that the tool of the present invention enables the meat of a potato to be quickly sliced and removed in a manner which requires a minimum of labor. As a result, potato skins can be produced much more quickly than heretofore has been possible, while at the same time preparing the meat of the potato for frying. The tool is, of course, relatively simple in construction so that it can be manufactured economically. Because the cutting edge assembly is fabricated of stainless steel, it is relatively strong and resistant to bending and corrosion. Moreover, because of the thinness of the blade material, no special edge forming processes are required.

While a preferred embodiment of the present invention has been described in detail, various modifications, alterations and changes may be made without departing from the spirit and scope of the present invention as defined in the appended claims.

What is claimed is:

1. A tool for use on a partially-baked half of a potato for separating the meat of the potato from its skin and simultaneously cutting the meat into separate chunks, comprising:
   a handle,
   shaped cutting edge means mounted at one end of said handle and extending laterally at an obtuse angle with respect thereto,
   said cutting edge means including:
      a central blade having a stem connected at one end to said handle and extending away therefrom,
      a pair of blades diverging from said central blade at an acute angle with respect thereto and at a location spaced from said handle about midway of the length of said central blade, and
      an arcuate blade having a hoop-shaped form connected to said pair of blades and said central blade remote from said handle and returning to said handle for cooperating with said diverging and central blades to form therebetween a pair of segments of a predetermined cross-section,
   so that when the tool is gripped in one hand and the potato half in the other, the blades can be engaged with and drawn through the potato for cutting the meat thereof into separate chunks.

2. The tool according to claim 1 wherein said pair of blades have stem portions extending along opposite sides of said central stem from said location, and including means at said location securing said pair of blades to said stem.

3. The tool according to claim 2 wherein said hoop-shaped arcuate blade has a pair of extensions disposed along opposite sides of said blade pair stems adjacent said handle, and including means carried by said handle for clamping said extensions against said blade stems.

4. The tool according to claim 3 wherein said clamping means includes a slot provided in said handle for receiving said extensions and blade stems, and a set screw threaded into said handle for engaging said extensions and blade stems.

5. The tool according to claim 1 wherein said angle is about 110°.

6. The tool according to claim 1 wherein said central stem, blades and arcuate blade are fabricated of a thin ribbon of metal and are disposed in a common plane with their cutting edges disposed normal to said plane.

7. A tool for use on a partially-baked half of a potato for separating the meat of the potato from its skin and simultaneously cutting the meat into separate chunks comprising:
   a handle,
   shaped cutting edge means mounted at one end of said handle at an obtuse angle relative thereto,
   said shaped cutting edge means including a central blade portion, a pair of blades diverging therefrom at a location spaced from said handle, and an arcuate blade disposed in the form of a hoop engaging the distal ends of said central blade and said pair of blades,
   so that when the tool is gripped in one hand and the potato half in the other, the blades can be engaged with and drawn through the potato for cutting the meat thereof into chunks.

* * * * *